D. D. Whitker,
Bench Plane.
No. 52,478.    Patented Feb. 6, 1866.
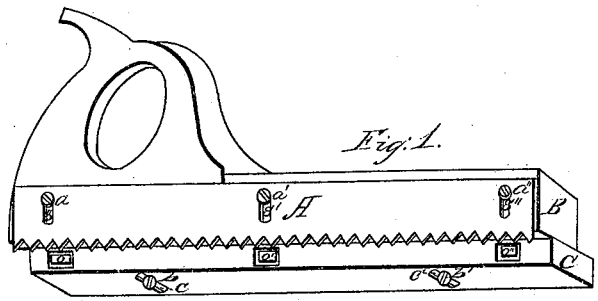
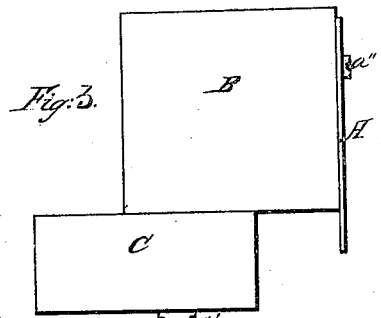
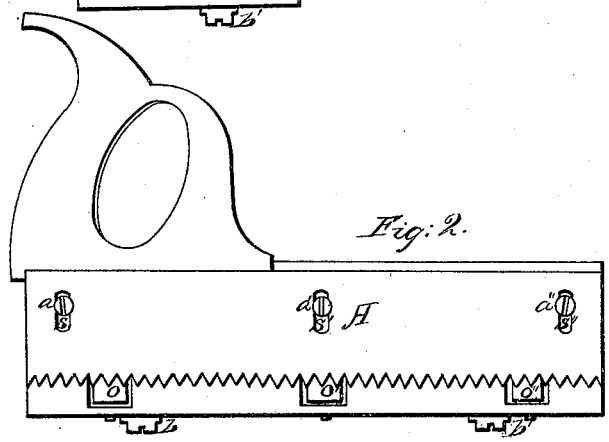
Witnesses:
Frank A. Macy
Willard S. Wood
Inventor:
Daniel D. Whitker

UNITED STATES PATENT OFFICE.

DANIEL D. WHITKER, OF HUDSON, NEW YORK.

IMPROVEMENT IN SAW-RABBET PLANES.

Specification forming part of Letters Patent No. 52,478, dated February 6, 1866.

*To all whom it may concern:*

Be it known that I, DANIEL D. WHITKER, of the city of Hudson, in the county of Columbia and State of New York, have invented a new and useful Tool or Instrument for Rabbeting and Plowing or Grooving Lumber, which I call or denominate the "Saw-Rabbet;" and I hereby declare that the following is a clear and exact description of the construction and operation of the same, reference being had to the annexed drawings, making a part of this specification, in which—

Figure 1 is a perspective view. Fig. 2 is a longitudinal or side elevation; and Fig. 3 is a transverse section or end view.

The nature of my invention consists in combining an adjustable saw with an adjustable fence or gage, both being attached to a stock with handle similar to a plane, forming together a tool combining the properties of the joiner's plow and fillister.

To enable those skilled in the art to make and use my invention, I will proceed to describe its construction and operation.

I construct my saw-rabbet with stock and handle similar to a plane, but without mortise for the iron. To the outside of this stock I attach, by means of the screws $a$ $a'$ $a''$, an adjustable saw, A. The slots $s$ $s'$ $s''$ in the saw enable it to be set up or down, so as to cut any desired depth. This saw may be of any required thickness for inserting panels, or by means of the adjustable fence or gage C, attached to the bottom of the stock B by the screws $b$ $b'$ through the slots $c$ $c'$, may be made to saw one, two, or more cuts or grooves at any desired distance from the edge for rabbeting, or a part for grooving, and the intermediate wood removed by a chisel or ordinary rabbet-plane. But the saw-rabbet is specially adapted to cutting grooves for inserting the rubber weather-strip, and the only tool that can be used advantageously for that purpose. In addition to the foregoing it will do all the work of both the fillister and the plow. It can also be easily converted into a useful tool for rabbeting on curves or circles by setting out one or both ends of the saw by means of curved wedges or thumb-screws. A steel spring fence or gage may then be employed and be set out with the saw.

The stock to which the saw is attached may be of wood or metal. The friction-rolls $o$ $o'$ $o'$ in the front edge of the gage rest or fence are employed to lessen the friction in operating the saw-rabbet.

The operation of this instrument needs no explanation. It is employed precisely like the fillister and plow, the operation of which is well understood by all carpenters and joiners, and indeed by all who have any acquaintance with these tools.

What I claim as my invention, and desire to secure by Letters Patent of the United States, is—

Combining and arranging the adjustable saw A with the adjustable gage-rest C, substantially in the manner and for the purpose herein set forth.

DANIEL D. WHITKER.

Witnesses:
FRANK A. MACY,
WILLARD S. WOOD.